United States Patent [19]
Willis

[11] 3,793,812
[45] Feb. 26, 1974

[54] IN-LINE MULTITUBE CENTRIFUGAL SEPARATOR

[76] Inventor: Robin Burke Willis, 4166 Monaco, Corpus Christi, Tex. 78411

[22] Filed: May 12, 1972

[21] Appl. No.: 252,900

Related U.S. Application Data

[63] Continuation-in-part of Ser. No. 66,545, Aug. 24, 1970, abandoned.

[52] U.S. Cl. ...................... 55/338, 55/319, 55/347, 55/348, 55/448, 55/457
[51] Int. Cl. ............................................ B01d 45/12
[58] Field of Search ............... 55/346–348, 318–319, 55/434, 456–457, 442–444, DIG. 17, DIG. 22, DIG. 23, 396, 448–451, 338

[56] References Cited
UNITED STATES PATENTS

| | | | |
|---|---|---|---|
| 2,806,551 | 9/1957 | Heinrich | 55/348 X |
| 3,360,908 | 1/1968 | Baily | 55/347 |
| 774,519 | 11/1904 | Greenaway | 55/442 |
| 2,804,171 | 8/1957 | Yellott et al. | 55/348 X |
| 1,899,498 | 2/1933 | Fedeler | 55/444 X |
| 1,333,325 | 3/1920 | McGee | 55/348 X |
| 1,970,077 | 8/1934 | Collins | 55/457 |
| 2,847,087 | 8/1958 | Johnson | 55/457 X |
| 2,659,450 | 11/1953 | Baird | 55/456 X |
| 2,186,344 | 1/1940 | Price | 55/456 X |
| 3,633,342 | 1/1972 | Richardson | 55/456 UX |
| 3,670,479 | 6/1972 | Tomlinson | 55/457 X |

FOREIGN PATENTS OR APPLICATIONS

| | | | |
|---|---|---|---|
| 943,392 | 3/1949 | France | 55/457 |
| 824,832 | 12/1959 | Great Britain | 55/318 |
| 290,274 | 8/1953 | Switzerland | 55/457 |
| 185,242 | 10/1963 | Sweden | 55/456 |
| 225,406 | 11/1959 | Australia | 55/457 |
| 628,212 | 8/1949 | Great Britain | 55/457 |
| 519,881 | 3/1955 | Italy | 55/457 |
| 1,146,262 | 3/1969 | Great Britain | 55/457 |
| 341,054 | 9/1959 | Switzerland | 55/396 |
| 1,069,071 | 7/1954 | France | 55/396 |
| 353,530 | 4/1905 | France | 55/396 |
| 711,304 | 6/1954 | Great Britain | 55/396 |

*Primary Examiner*—Frank W. Lutter
*Assistant Examiner*—Vincent Gifford
*Attorney, Agent, or Firm*—E. Peter Johnson

[57] ABSTRACT

An in-line separator for removing entrained liquid from a pipeline gas flow is provided. The separator has a plurality of vortex tubes mounted within a common shell. Each vortex tube is formed with a single circumferential recycle gap at its outlet end. A hub, carrying vanes, is mounted in the inlet of each vortex tube. Each hub defines a recycling conduit connecting the outer chamber, defined between the shell and the vortex tubes, with the low pressure zone which exists along the longitudinal axis of the vortex tube. Centrifugal separation of the liquid from the gas occurs within each vortex tube, due to the twist given to the stream by the vanes. The separated liquid moves along the vortex tube wall to the recycle gap, through which it is sucked together with some gas. As the recycled steams slowly travel through the outer chamber from the gaps to the hub recycle conduits, the liquid drops out by gravity separation and is collected. The liquid-free gas returns to the main flow through the recycle conduits.

1 Claim, 4 Drawing Figures

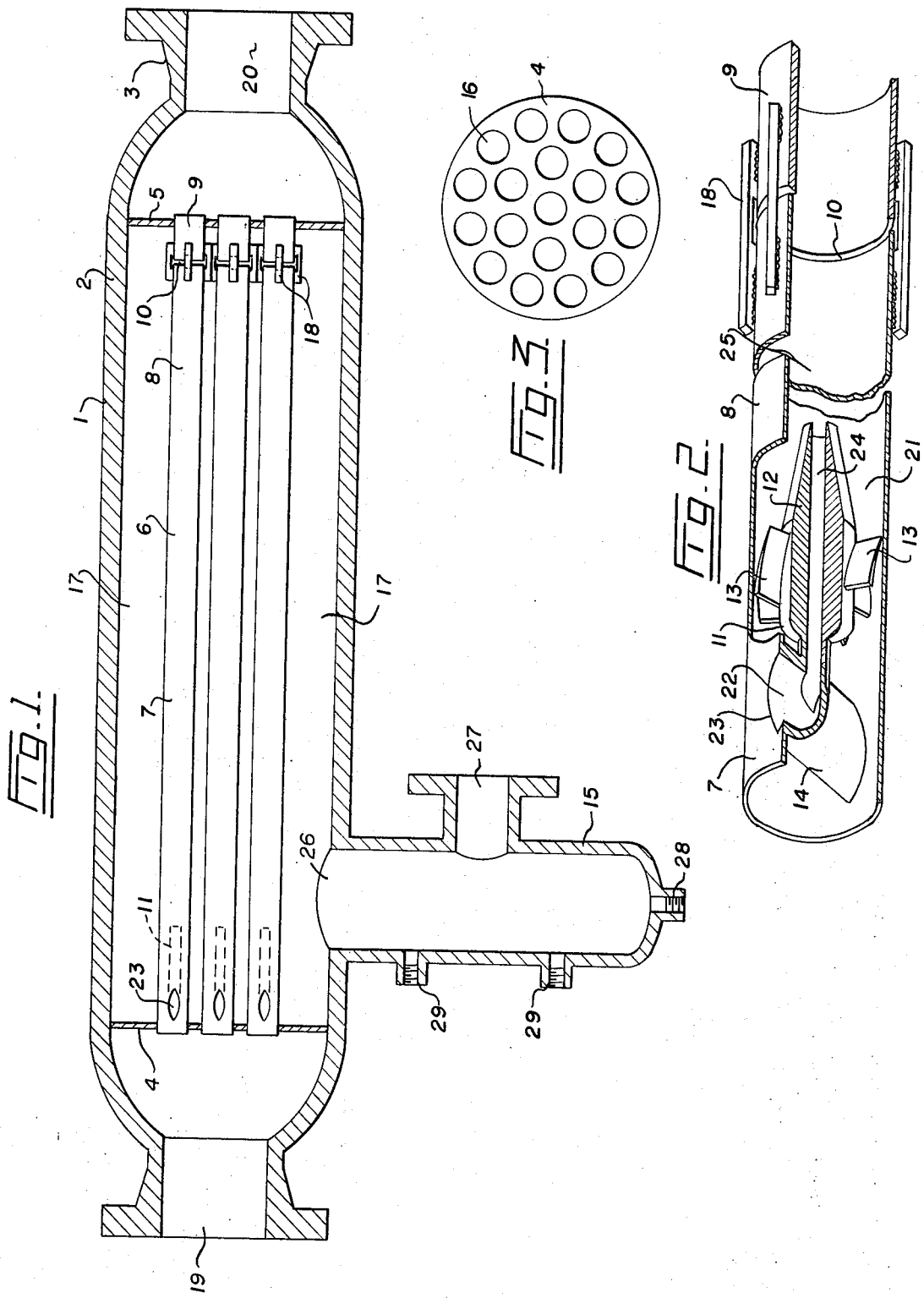

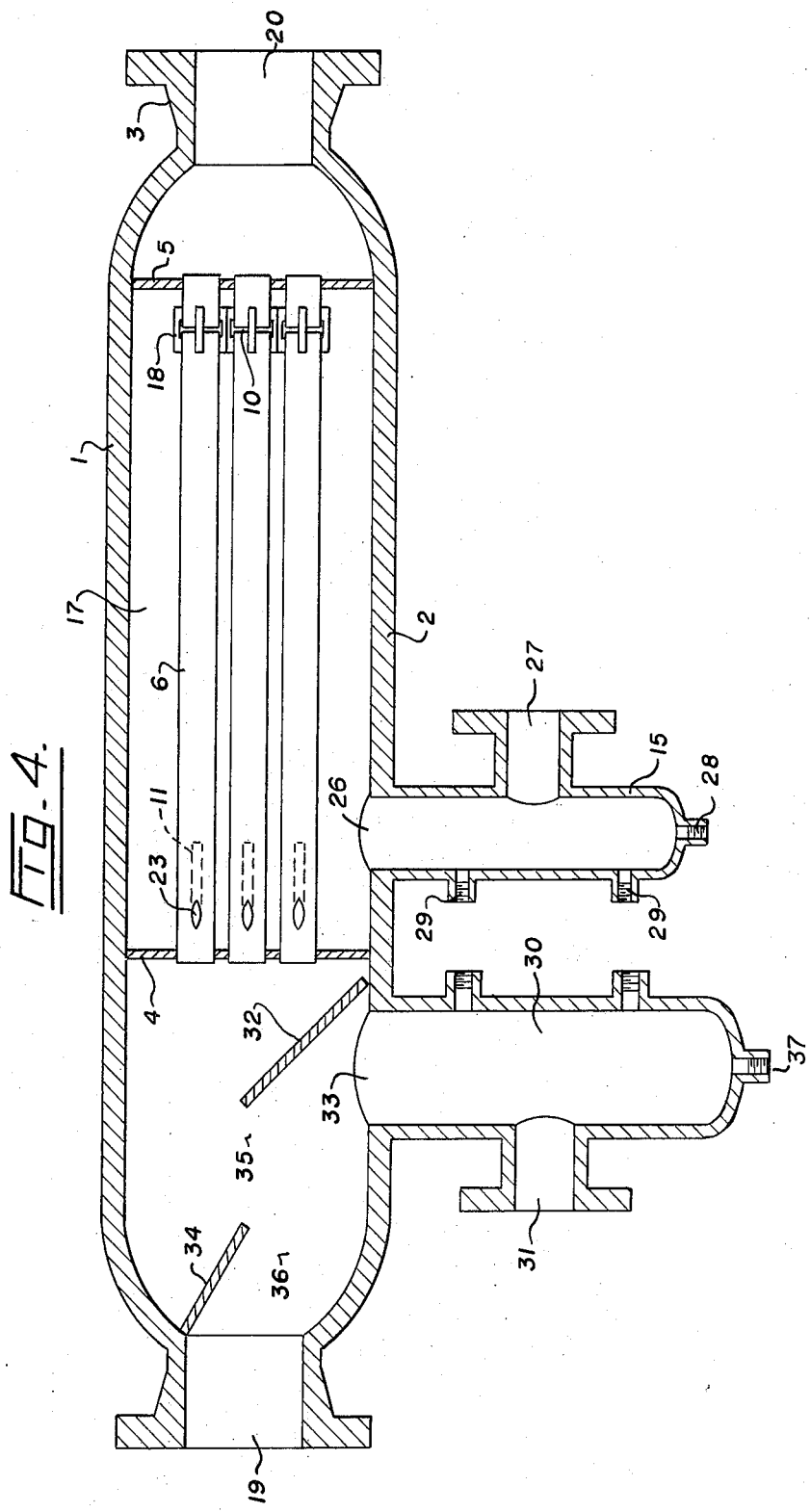

IN-LINE MULTITUBE CENTRIFUGAL SEPARATOR

CROSS-REFERENCE TO RELATED APPLICATION

This application is a continuation-in-part of my application for United States Letters Pat. No. 66545, filed Aug. 24, 1970, now abandoned.

BACKGROUND OF THE INVENTION

This invention relates to a separator for the removal of liquid from a gas stream.

In an operation such as that of a natural gas transmission line, it is desirable to remove virtually all the liquids entrained in the gas flow. This liquid is present in amounts up to 100 gallons per Million Standard Cubic Feet of gas, usually about 1 to 10 Gal./MMscf. The degree of removal which is usually specified is high, i.e., in the order of 99 percent or better. The separation should be carried out with as low a pressure drop across the separator as possible, i.e., in the order of 5 psi or less.

SUMMARY OF THE INVENTION

It is an object of this invention to provide a self-powered separator which uses centrifugal forces to effect segregation of substantially all the entrained liquid in a gas stream fed to the separator, withdraws the segregated liquid from the main stream together with a portion of the gas, separates the liquid from the gas portion using gravity forces, and collects the liquid while returning the gas portion to the main stream.

It is another object to provide a separator of this type which is characterized by a sufficiently high separation efficiency and sufficiently low pressure drop to make it acceptable for use in natural gas transmission lines and the like.

It is another object to provide a separator of this type which utilizes the zone of lowest pressure in the separator as the means for providing suction for the withdrawing operation.

It is another object to provide a separator of this type having a plurality of centrifugal zones of sufficient length to ensure that the centrifugal forces created therein will act on the liquid particles moving therethrough for a sufficiently long period of time whereby substantially all the particles become segregated together at the outer edges of the zones.

It is another object to provide a separator of this type which is competitive in terms of manufacturing cost, relative to the separators now used in natural gas transmission lines.

In accordance with the invention, the separator comprises an outer tubular shell, usually a length of steel pipe. The shell is connected into and forms part of the pipeline carrying the gas-liquid stream. First and second apertured plates are fixed in spaced-apart relationship within the shell. Each of these plates is positioned transversely to the shell's longitudinal axis and is sealed around its periphery to the shell wall. The first plate is located adjacent the shell inlet and the second plate at its outlet. The apertures in the plates match up as to number and location.

A plurality of vortex tube assemblies are fixed within the enclosure formed by the shell and plates. Each of these assemblies comprises a vortex tube having a spin-inducing hub unit mounted in its inlet end. The vortex tubes extend between the plates and connect opposed plate apertures. The openings at the ends of each vortex tube communicate with the inlet and outlet of the shell and a flow path for the pipeline stream is therefore provided through the separator. Each vortex tube comprises two substantially co-axial, fixed tube sections. These sections are spaced apart longitudinally to define a single circumferential recycle gap between them. This gap is located at the outlet end of the vortex tube.

A gravity separation chamber is defined between the shell, plates and vortex tubes. The recycle gaps connect the downstream end of this chamber with the interiors of the vortex tubes.

As mentioned, a hub unit is mounted at the inlet of each vortex tube. The unit includes a cigar-shaped hub fixed co-axially in the vortex tube. An annular passage is defined between the hub and the vortex tube wall. Radial vanes extend outwardly from the hub into the annular passage. These vanes function to impart a spinning motion to the gas-liquid stream entering the vortex tube. The hub unit is formed with a passageway termed the recycle conduit. This conduit connects the gravity separation chamber with the interior of the vortex tube at a point downstream of the hub and coincident with the tube's longitudinal axis. To summarize, the hub and its vanes provide means, associated with the vortex tube at its inlet, which are adapted to impart a spinning motion to the stream entering the vortex tube. In addition, a recycling circuit is provided connecting the recycle gaps with the axial low pressure zones in the vortex tubes; this circuit is comprised of the gravity-separation chamber and the recycle conduit.

Liquid collection means communicates with the gravity separation chamber, preferably at the inlet end of the separator. This means may comprise a pot forming part of the shell wall The pot is provided with wall. outlet. A float-operated valve can be installed in the outlet to control the periodic emptying of the pot contents.

When the separator is in operation, the pipeline flow enters the plurality of vortex tubes. As each gas-liquid stream passes into the constricted annular passage between the hub and vortex tube wall, its flow velocity is increased. At the same time, the vanes cause it to follow a helical path about the longitudinal axis of the vortex tube. The centrifugal forces created cause the liquid entrained in the gas to accumulate against the inner surface of the upstream vortex tube section. The longitudinally moving, whirling, central gas vortex drags this liquid along the tube wall to the recycle gap. Suction is applied at the gap through the recycling circuit. As a result, the liquid and a minor portion of the gas is drawn through the gap while the remaining liquid-free gas moves on downstream into the pipeline. Most of the liquid drops out of the carrier gas by gravity separation as the recycled stream moves slowly through the gravity-separation chamber. This liquid drops to the bottom of the shell and is collected in the pot. The gas is returned to the vortex tubes through the recycling conduits. Any liquid remaining in the recycled gas is again spun out in the vortex tubes and recycled through the recovery circuit.

All of the structural elements of the separator are shown in the prior art; however, they have not previously been combined in the manner described and in accordance with the relationships listed hereinbelow to provide a separator which is capable of removing entrained liquid from gas with efficiencies of 99.9 percent or better and a pressure drop of 2 psi or less.

By experimentation with transparent plexi-glass separator models, certain limitations of recycling centrifugal separators were determined. More specifically, it was observed that, if the recycle gap was too narrow, the liquid moving along the vortex tube wall would begin to bridge the gap. It was also observed that, if the recycle gap was too wide, the velocity of the gas stream passing through the gap would be reduced to a level where the liquid would begin to be carried across the gap rather than through it. It was further observed that, while the velocity through the gap could be increased by increasing the volume of the recycle stream, there was limitation on this approach in that one had to simultaneously increase the hub diameter to provide a larger hub passageway to accomodate the increased flow - this eventually led to an intolerable pressure drop through the annular passage between the hub and vortex tube. Finally, it was observed that at most only about 15 percent by volume of the gas flow would recycle.

With these constraints in mind, I have determined that the separator should be made in accordance with the following relationships:

1. The recycling opening must be in the form of a single gap to maximize its width and thereby help to minimize liquid bridging.

2. The recycle circuit must be connected with the interior of the vortex tube downstream of the hub at its longitudinal axis. As a result, the core of the gas vortex, which is the zone of lowest pressure in the separator, provides the suction at the gap. This arrangement helps to maximize the volume and hence the velocity of the recycle stream.

3. The width of the single recycle gap must be between 0.01D and 0.04D, where D is the internal diameter of the vortex tube. If the width is less than 0.01D, liguid rivulets in the vortex tube tend to bridge the gap. If it is greater than 0.04D, the gas velocity through the gap is insufficient and liquid is carried across it by the main gas stream.

4. The length of the vortex tube from the downstream end of the vanes to the recycle gap should be greater than 4D, preferably between 4D and 20D. If the length is less than 4D, liquid entrained in the gas is not subjected to centrifugal force for a sufficiently long period of time and some of the liquid does not reach the vortex tube wall before the stream reaches the recycle gap.

5. The separator should comprise a plurality of vortex tube assemblies mounted in spaced-apart relationship within a single common housing or shell. This permits use of tubes of a size small enough to effectively remove the fine liquid particles entrained in typical transmission-line natural gas, and also reduces the separator's length and cost.

6. The maximum outside diameter of the hub should be between 0.5D and 0.8D. If the outside diameter is less than 0.5D, the flow distribution in the vortex tube is such that suction to drive the recycling circuit is reduced and recycling flow is thus reduced. If the outside diameter is larger than 0.8D, the available area for flow past the hub is too small and the pressure drop becomes higher than that desired.

7. The diameter of the hub bore should not be less than 0.2D. If it is less, the flow area in the recycling conduit is so small that recycling flow is restricted to less than that required for desirable separation efficiency.

From the foregoing it is seen that the invention is based to a large degree on understanding what is required to get the liquid from the inside surface of the vortex tube through the recycle gap and into the gravity separation chamber. What is required is the use of a circumferential recycling opening having the greatest possible width and a self-powered recycling circuit which is adapted to draw the greatest possible volume of recycle gas through the opening.

According to the method of the invention, liquid entrained in a gas-liquid mixture moving under pressure is separated by: establishing and maintaining a rotating body of the mixture in a cylindrical vortex tube, having an axial outlet at one end thereof and a single circumferential recycle gap adajacent to but spaced from the axial outlet, so as to effect a separation by centrifugal force of the liquid from the gas whereby substantially all the liquid accumulates at the outer section of the vortex tube and the bulk of the gas forms a vortex in the central section of the vortex tube; sucking substantially all the accumulated liquid and a portion of the gas through the gap opening into an annular confined zone maintained at reduced pressure by communication with the axial low pressure zone within the vortex tube; conducting the liquid and said portion of gas at reduced velocity along a flow path within the zone to separate the liquid from the gas by gravity separation; collecting the separated liquid; and exhausting the gas from the confined zone back into the vortex tube.

DESCRIPTION OF THE DRAWINGS

In the drawings which illustrate an embodiment of the invention:

FIG. 1 is a cross-sectional side view of the invention;

FIG. 2 is a perspective, partly broken away view of a vortex tube assembly;

FIG. 3 is a plan view of a typical mounting plate for a separator in accordance with the invention but adapted to accomodate a large number of vortex tubes;

FIG. 4 is a cross-sectional side view of the separator having a pot and weir included for trapping free liquid.

Referring now to FIG. 1, an in-line separator 1 in accordance with the invention is illustrated. Separator 1 includes a cylindrical shell 2 having flanged end caps 3. First and second apertured plates 4, 5 are mounted within the shell 2. Vortex tube assemblies 6 are fixed at their ends to plates 4, 5. Each vortex tube assembly 6 includes a vortex tube 7 comprised of first and second tube sections 8, 9. The tube sections 8, 9 are spaced apart longitudinally to define a circumferential recycle gap 10. A hub assembly 11, comprising a hub 12, radial vanes 13 and cross pipe 14, is fixed in the inlet end of the first tube section 8. A liquid collection pot 15 is formed in the lower wall of shell 2.

The structural elements of the separator will now be described in greater detail:

The shell 2 is formed of steel pipe having flanged end caps 3 welded thereto. Mounted within shell 2 are identical plates 4, 5. Each of these plates defines a number of spaced apertures 16. The number of apertures 16 corresponds with the number of vortex tube assemblies 6 which are used. The apertures in each plate match up location-wise so that the assemblies 6 are suspended in parallel, spaced relation when their ends are fixed in opposed apertures. The plates 4, 5 are welded about their periphery to the wall of shell 2 so as to form a sealing connection therewith. They provide end closure for the gravity-separation chamber 17.

Each vortex tube assembly 6 comprises an elongate vortex tube 7, of circular cross-section, formed of first and second tube sections 8, 9. These tube sections are co-axial and fixed relative to one another. They are spaced apart longitudinally by spacer bars 18 so as to define recycle gap 10. Each end of vortex tube 7 is shown inserted into a plate aperture 16. These ends are welded into place to provide a seal between plate and tube. It will be noted that the interior space of the vortex tube 7 thus communicates with the inlet 19 and outlet 20 of shell 2.

A hub assembly 11 is welded into place in the inlet end of each first tube setion 8. This hub assembly 11 includes a cigar-shaped hub 12 which is elongate and tapered at one end. The hub 12 is centrally disposed within tube section 8. An annular passage 21 is defined between the hub 12 and tube section 8. The hub 12 is connected at its upstream end to a cross pipe 14. The cross pipe 14 is welded at its ends to the walls of tube section 8, and its bore 22 communicates with openings 23 in the said wall. The hub 12 defines a longitudinal bore 24 which connects into bore 22. The bores 22 and 24 combine to form a recycle conduit. It will be noted that the longitudinal axis of the bore 24 coincides with the longitudinal axis of the tube section 8. A number of curved radial vanes 13 are mounted on the hub 12. These vanes 13 extend into the annular passage 21 and operate to change the direction of flow following the axis of the pipeline by about 45°.

The hub assembly 11 functions to accelerate the flow entering the vortex tube 7 and, at the same time, alters its direction of movement so that it will follow a helical path. Additionally, the recycle conduit defined by the assembly connects the gravity-separation chamber 17 with the low pressure zone at the core of the gas vortex within the tube.

Liquid collection means communicate with the gravity-separation chamber 17. One such means, a pot 15, is welded to an opening 26 in the bottom wall of shell 2. This pot 15 is located adjacent to inlet plate 4 to maximize the length of the flow path followed by the gas-liquid stream re-circulating from the recycle gaps 10 to the hub assembly openings 23. This selection of location has the effect of maximizing the gravity-separation. Pot 15 is shown having a flanged outlet 27 through which a float (not shown) may be inserted to actuate a dumping valve (not shown) controlling the outlet 28. Spaced openings 29 are provided in the wall of the pot 15 for mounting a sight glass (not shown).

In the above description I have referred to the "chamber" 17. This is an enclosure defined by the shell 2, plates 4, 5, pot 15 and vortex tubes 7. It is a sealed chamber with the exception that the reycle gaps 10 and hub assembly openings 23 open into it.

In FIG. 4, a pot and weir arrangement is illustrated. This structure is positioned upstream from the inlet plate 4. It includes a pot 30 having an inlet 33 formed in the lower wall of the shell 2. A bottom weir 32 is provided at the downstream lip of the inlet 33. This weir 32 extends upwardly from the bottom wall of the shell 2 at an angle of about 45°. A top weir 34 extends downwardly from the top wall of the shell 2, also at an angle of about 45°. Gaps 35 and 36 are defined between the weirs 32, 34 and the weir 34 and the bottom wall of shell 2 respectively. These gaps 35, 36 are each about equal in cross section to the inlet opening so as to avoid causing restriction. Free liquid moving along the bottom wall of the inlet section of the shell 2 drops into the pot 30 for removal through outlet 37. The weirs 32, 34 cause the gas flow entering through the inlet 19 to alter direction. This has the effect of trapping some entrained liquid in the gas against the bottom surface of weir 32.

It is self-evident that one skilled in the art could substitute mechanical equivalents for some of the parts described. For example, tangential inlets can be used in place of the vanes and a drain pipe can be substituted for the pot. Such equivalents are considered to be within the scope of the invention. It is also noted that I have described a steel separator having welded joints. Since the separators find their greatest use in high pressure operations, this will be the usual method of construction. However, it will be appreciated that other materials and joining means could be used.

It is preferable to limit the length of the vortex tube to between 6 and 20 diameters. If the flow leaves the vanes at an angle of about 45°, the helical angle of flow at a point 8 diameters down the tube is about 30° and at a point 20 diameters down the tube it is about 20°. In other words, the flow tends to straighten itself out as it moves down the vortex tube. I find that a satisfactory degree of separation for most applications is obtained if the above limitation is observed. Increasing the length of the separator does little to increase the efficiency of separation, while it does increase its cost.

The separator size is affected by the allowable pressure drop across it at a given rate of throughput. The separator will have a characteristic resistance to flow, analogous to the characteristic of a meter orifice plate. I have developed formulas and dimensional relationships which may be used to design an efficient separator in accordance with this invention. These formulas and relationships are not to be considered as limitations on the invention since they may be departed from without seriously affecting the separator operation. They are provided as a useful guide in designing an efficient embodiment.

The formulas and relationships are as follows:

$$C = 345 \, Q \, \sqrt{G \, Z \, T / p \, dp} \quad (1)$$

Where:
$Q$ = flow rate, MMCF/day
$C$ = separator flow coefficient
$G$ = gas gravity, air = 1
$Z$ = gas compressibility factor
$T$ = temperature, °Rankine
$dp$ = pressure drop across separator, p.s.i.
$P$ = static pressure at inlet, p.s.i.a.

$$C = C'N \quad (2)$$

Where:

C' = flow coefficient of one vortex tube
N = number of vortex tubes $$C' = 130\ D^2 \tag{3}$$

Where:

D = inside diameter of vortex tube.

The inside diameter of the vortex tube can vary widely. We have standardized on 2, 3, 4 and 6 inch tubes. These are standard pipe sizes and therefore are readily available.

Upon selecting D, one can solve the equations to determine N, the number of vortex tubes.

4. The other preferred dimension relationships are:
hub outside diameter = 0.67D
hub inside diameter = 0.33D
cone length - 1.2D
gap spacing = 0.03D
outlet tube inside diameter = 0.94D
length from vanes to gap = 8D to 20D
8 vanes, each 0.06d thick and 0.75D long and curved to turn the gas approximately 45°. This embodiment of the invention will now be illustrated by the following example

EXAMPLE 1

A centrifugal separator conforming to that illustrated in FIG. 1 was constructed of steel. The separator was installed in a natural gas processing plant to remove small amounts of lean oil from gas and thus prevent the lean oil from contaiminating the silica gel bed of a dry dessicant-type gas dehydrator. Operating conditions were as follows:

gas flow = 100 MMCF/d at 800 p.s.i.g. and 100°F
gas specific gravity = 0.6
compressibility factor = 0.1
lean oil flow = approximately 40 gallons per day The dimensions of the separator were as follows:
inside diameter of shell = 16.1 inches
overall length of separator = 7 feet 3 inches
inside diameter of pot = 7.25 inches
length of pot = 22 inches
line size = 8 inches
number of vortex tubes = 19
vortex tube inside diameter = 2.06 inches
hub outside diameter = 1.38 inches
hub inside diameter = 0.68 inches
cone length = 2.5 inches
gap spacing = 0.06 inches
length from vanes to gap = 4 feet 4 inches
8 vanes, each one/eighth inch thick, 1 ⅜ inch long, curved 45°.

The separator was installed and in operation removed better than 99 percent of the lean oil from the gas, thereby greatly increasing the life of the silica gel bed in the dehydrator. The pressure drop across the separator was 5 p.s.i.

What is claimed is:

1. A separator for removing, with high separation efficiency and low pressure drop, entrained liquid in natural gas passing through a transmission line, which comprises:

a. a tubular shell adapted to be connected at its ends into the transmission line;

b. first and second apertured plates mounted in spaced-apart relationship within the shell, transverse to its longitudinal axis, and positioned adjacent the inlet and outlet of the shell, respectively, each plate being sealed around its periphery to the shell wall;

c. a plurality of vortex tube assemblies, in parallel, spaced apart tube-and-shell relationship to the shell, extending between the plates and connected thereto at respective opposed apertures to provide a plurality of flow paths for the natural gas through the separator, the interior wall of the shell, the exterior walls of the vortex tube assemblies, and the interior faces of the plates, in combination defining a single gravity-separation and gas recycle chamber, each said vortex tube assembly comprising:

i. a vortex tube of length between 4D and 20D wherein D is the internal diameter of the vortex tube, and consists of two fixed, substantially coaxial tube sections which are spaced apart at a point adjacent the outlet end of vortex tube to define a single annular slot having a width between 0.01D and 0.04D providing liquid and gas communication from the interior of the vortex tube to the gravity separation chamber; and ii. a hub assembly, fixed axially within and adjacent to the inlet end of the vortex tube, said hub assembly having a hub having a maximum outside diameter of between 0.5D and 0.8D and cooperating with the vortex tube wall to form a constricted annular passage for the natural gas entering the vortex tube and to form an axial low pressure zone therein, said hub assembly having a recycle conduit of greater than 0.2D, one end of which forms a bore in said hub, connecting the gravity-separation chamber with the axial lower pressure zone of the interior of the vortex tube, downstream of the hub, said hub assembly comprising vanes extending into the annular passage for imparting a spinning motion to the stream entering the vortex tube; and d. liquid collection means communicating with the interior of the shell, the constricted annular passage in the vortex assembly increasing the flow velocity of the gas and the vanes causing the gas to follow a helical path along the longitudinal axis of the vortex tube, the resultant centrifugal forces causing entrained liquid to accumulate against the inner surface of the upstream fixed tube section and the longitudinal moving, whirling gas dragging the liquid along that tube section to the annular slot, where the lower pressure of the gravity separation chamber draws the liquid through the annular slot.

* * * * *